United States Patent
Wu et al.

(10) Patent No.: US 7,570,313 B2
(45) Date of Patent: Aug. 4, 2009

(54) FRAME AND LIQUID CRYSTAL DISPLAY MODULE UTILIZING THE SAME

(75) Inventors: Chia-Jung Wu, Jilin Village (TW); Chi-Chung Lo, Wufu Village (TW)

(73) Assignee: Au Optronics Corp., Hsinchu (TW)

( * ) Notice: Subject to any disclaimer, the term of this patent is extended or adjusted under 35 U.S.C. 154(b) by 228 days.

(21) Appl. No.: 11/151,895

(22) Filed: Jun. 14, 2005

(65) Prior Publication Data

US 2006/0118684 A1 Jun. 8, 2006

(30) Foreign Application Priority Data

Dec. 2, 2004 (TW) .............................. 93137165 A

(51) Int. Cl.
*G02F 1/1333* (2006.01)

(52) U.S. Cl. .............................. 349/58; 349/60; 348/836

(58) Field of Classification Search .................. 248/917, 248/918, 346.04, 346.5; 349/58, 60; 348/836; 362/633, 632

See application file for complete search history.

(56) References Cited

U.S. PATENT DOCUMENTS

| | | | | |
|---|---|---|---|---|
| 5,570,267 A * | 10/1996 | Ma | ............................. | 361/681 |
| 6,002,582 A * | 12/1999 | Yeager et al. | ............... | 361/681 |
| 6,507,377 B1 * | 1/2003 | Jung | ............................. | 349/58 |
| 7,006,169 B2 * | 2/2006 | Liu | ............................. | 349/58 |
| 7,046,316 B2 * | 5/2006 | Lai | ............................. | 349/58 |
| 7,237,941 B2 * | 7/2007 | Hsieh et al. | ................. | 362/633 |
| 7,445,369 B2 * | 11/2008 | Yu et al. | ..................... | 362/612 |
| 2002/0080297 A1 * | 6/2002 | Sung | ............................. | 349/58 |
| 2004/0090560 A1 * | 5/2004 | Jang | ............................. | 348/836 |
| 2005/0157520 A1 * | 7/2005 | Chuang et al. | .............. | 362/632 |
| 2008/0100769 A1 * | 5/2008 | Hsiao et al. | .................... | 349/58 |

FOREIGN PATENT DOCUMENTS

| | | |
|---|---|---|
| JP | 2001-022291 | 1/2001 |
| JP | 2002-156632 | 5/2002 |
| JP | 2003-098510 | 4/2003 |
| JP | 2003-202550 | 7/2003 |

* cited by examiner

*Primary Examiner*—A. Joseph Wujciak, III
(74) *Attorney, Agent, or Firm*—Thomas, Kayden, Horstemeyer & Risley

(57) ABSTRACT

A liquid crystal display module and a frame applied in the liquid crystal display module. The liquid crystal display module includes a frame and a liquid crystal panel. The frame includes a sidewall and an elastic arm. The sidewall includes a first portion and a second portion. The elastic arm is located between the first portion and the second portion. The elastic arm includes a base portion and an abutment portion. The base portion connects the first portion and the second portion. The liquid crystal panel is disposed in the frame in a manner such that it abuts the abutment surface.

10 Claims, 9 Drawing Sheets

FRAME AND LIQUID CRYSTAL DISPLAY MODULE UTILIZING THE SAME

BACKGROUND

The invention relates to liquid crystal display modules, and in particular, to liquid crystal display modules comprising a frame with an elastic arm for holding a liquid crystal panel thereof.

In a liquid crystal display module, a frame often comprises an elastic mechanism to hold a liquid crystal panel therein. Referring to FIGS. 1a and 1b, a conventional frame 10 comprises a plurality of elastic mechanisms 11 at its sidewall. Although the elasticity of the elastic mechanisms is good, a mold for manufacturing the frame 10 is complicated, and the frame 10 is difficult to manufacture. Additionally, if a portion, connecting the elastic mechanism and the sidewall, is overly thin, it may be broken. Conversely, if the portion is overly thick, its elasticity may suffer.

Referring to FIGS. 2a-2b, another conventional frame 20 comprises a plurality of elastic arms 21 at its sidewall. When a liquid crystal panel is assembled in the frame 20, it pushes the elastic arms 21 outward if it interferes with the elastic arms 21. Since the force may be concentrated at portions connecting the elastic arms and the sidewall, the elasticity of the elastic arms may suffer. Additionally, it is difficult to separate the assembled liquid crystal panel from the frame 20.

Furthermore, other frames are disclosed in Japan Pat. Pub. No. 2003-202550, 2002-156632, 2001-022291, and 2003-098510. The common disadvantage of the above frames is that a mold for manufacturing the frame is complicated, thus increasing the cost.

SUMMARY

Liquid crystal display modules are provided. An exemplary embodiment of a liquid crystal display module comprises a frame and a liquid crystal panel. The frame comprises a sidewall and an elastic arm. The sidewall comprises a first portion and a second portion. The elastic arm comprises a base portion and an abutment portion, and is located between the first portion and the second portion. The base portion connects the first portion and the second portion. A notch is formed between the abutment portion and the first and second portions respectively. The abutment portion extends upward from the base portion toward the inside of the frame. The liquid crystal panel is disposed in the frame in a manner such that the liquid crystal panel abuts the abutment surface of the abutment portion of the elastic arm.

Note that the elastic arm is substantially an inverted T-shape or I-shape.

Moreover, the frame further comprises a bottom and a support on which the liquid crystal panel is disposed. Alternatively, the frame further comprises a support on which the liquid crystal panel is disposed, and a cross section of the sidewall and the support is substantially T-shape or L-shape.

Note that the thickness of the sidewall is greater than the thickness of the abutment portion, and the thickness of the elastic arm. Additionally, the elastic arm and the sidewall are integrally formed into a single piece, and the frame comprises plastic.

DESCRIPTION OF THE DRAWINGS

The invention can be more fully understood by reading the subsequent detailed description and examples with references made to the accompanying drawings, wherein:

FIG. 1b is a partially enlarged view of a portion A in FIG. 1a;
FIG. 2b is a partially enlarged view of a portion B in FIG. 2a;
FIG. 4c is a partially enlarged view of a portion C in FIG. 4a;
FIG. 4d is a top view of a portion C in FIG. 4a;
FIG. 5a is a cross section along line a-a in FIG. 4a.

DETAILED DESCRIPTION

Figure 1A:
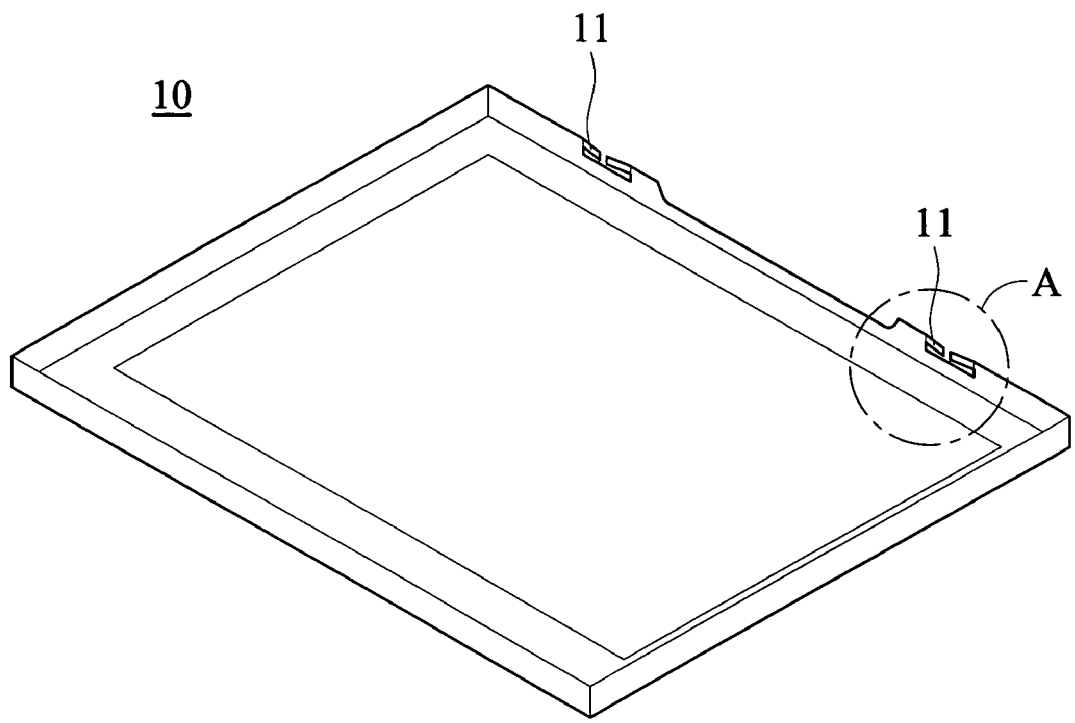
FIG. 1a is a schematic view of a conventional frame.
Figure 1B:
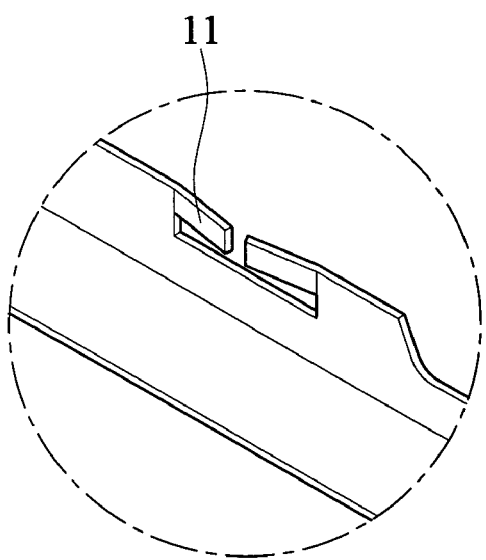
Figure 2A:
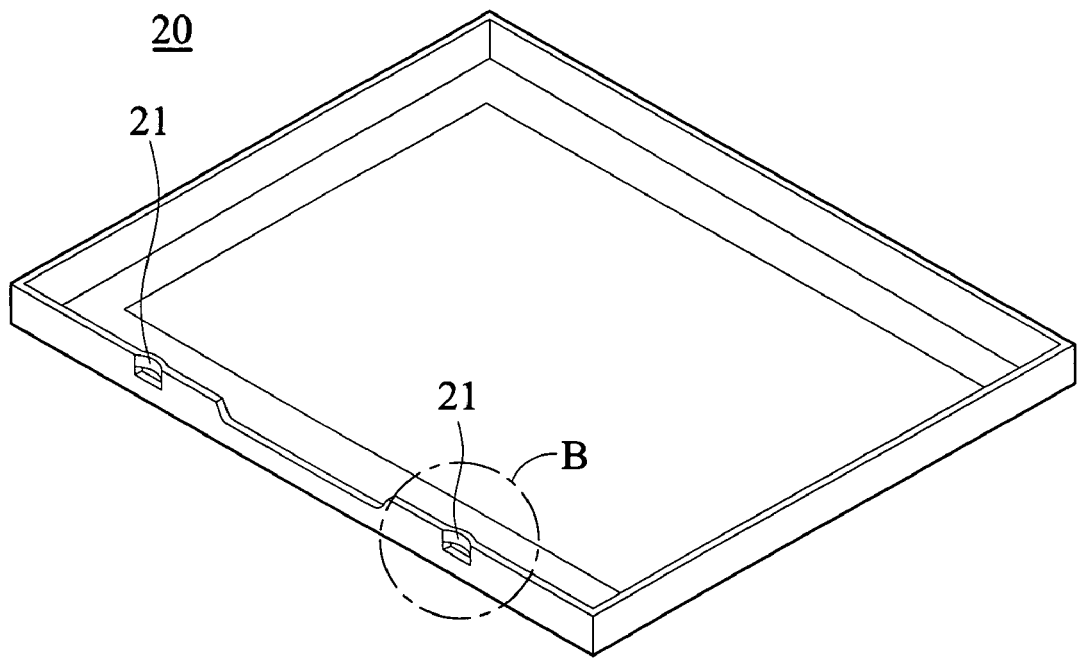
FIG. 2a is a schematic view of another conventional frame.
Figure 2B:
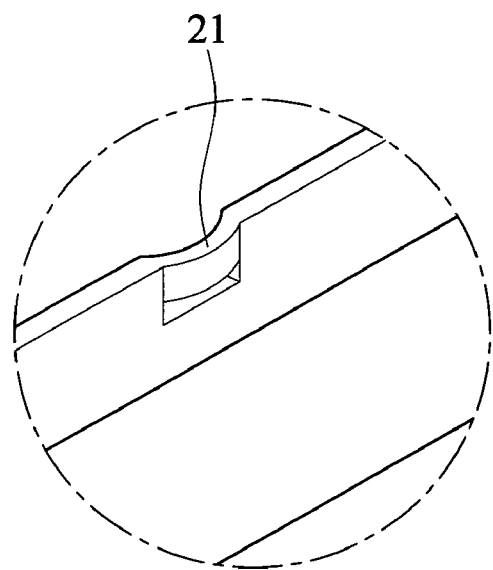
Figure 3:
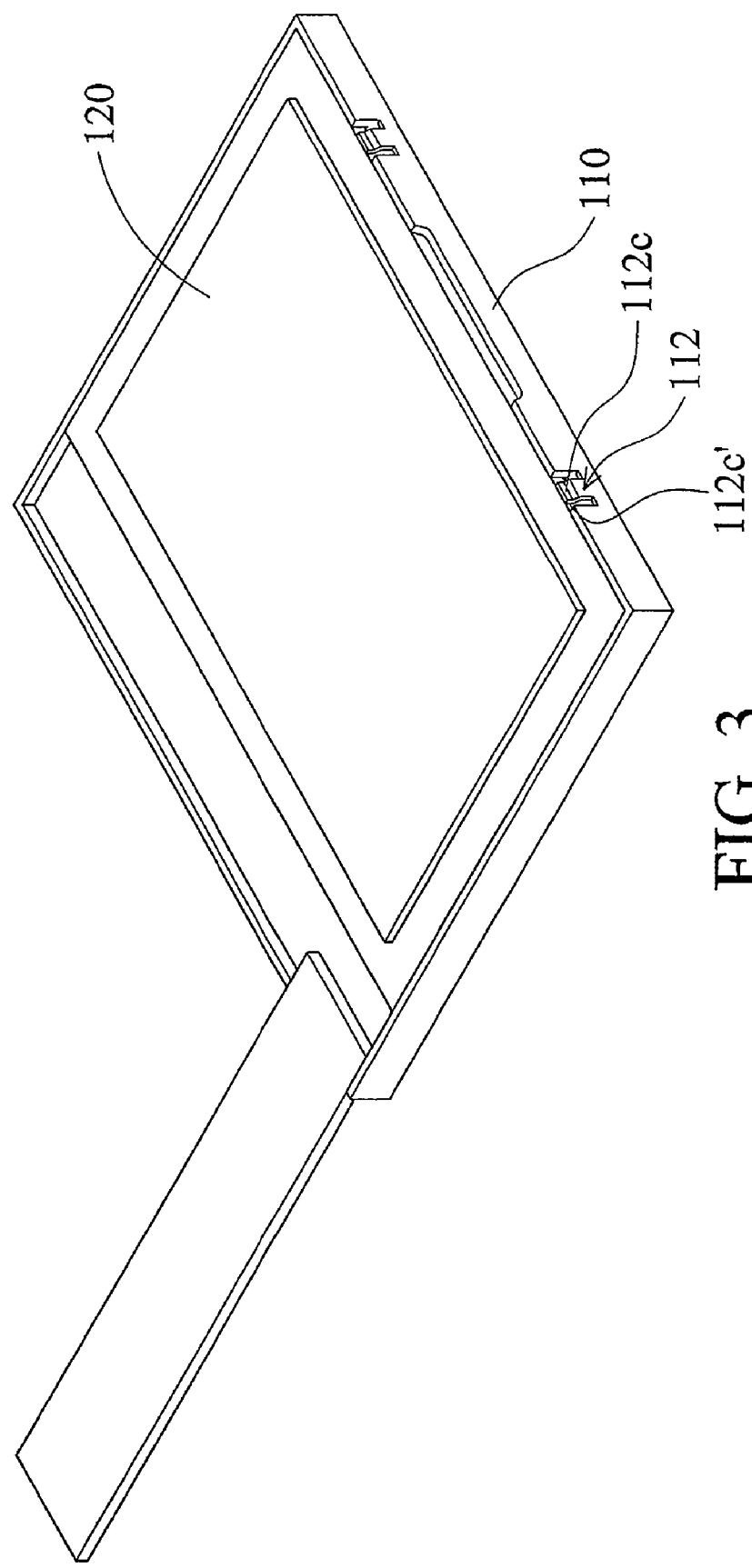
FIG. 3 is a schematic view of an embodiment of a liquid crystal display module.

Referring to FIG. 3, an embodiment of a liquid crystal display module 100 comprises a frame 110 and a liquid crystal panel 120. The frame 110 receives the liquid crystal panel 120 and a backlight module (not shown) therein. The liquid crystal panel 120 and the backlight module constitute a display unit of the liquid crystal display module 100.

Figure 4A:
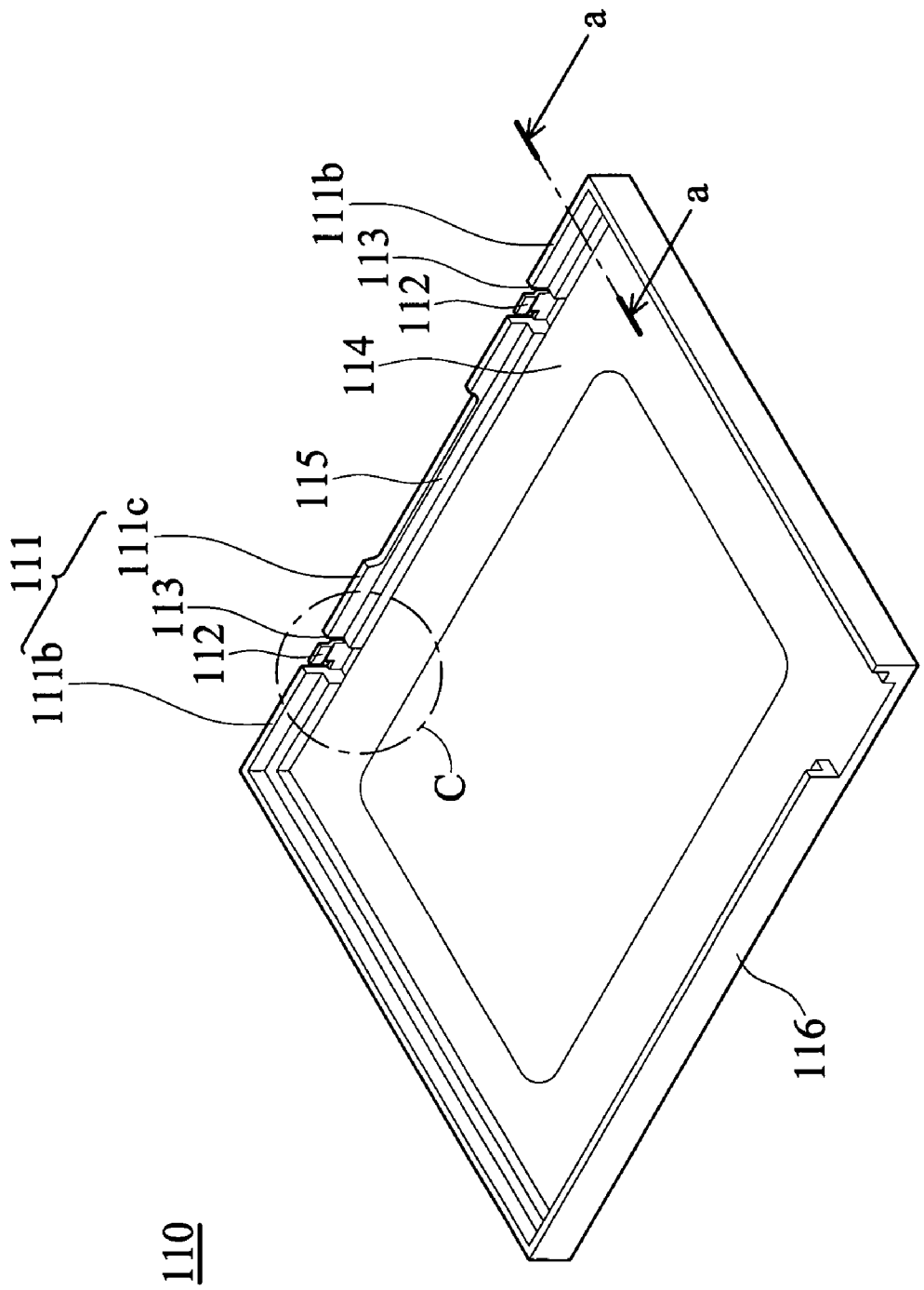
FIGS. 4a-4b are schematic views of a frame in FIG. 3.
Figure 4B:
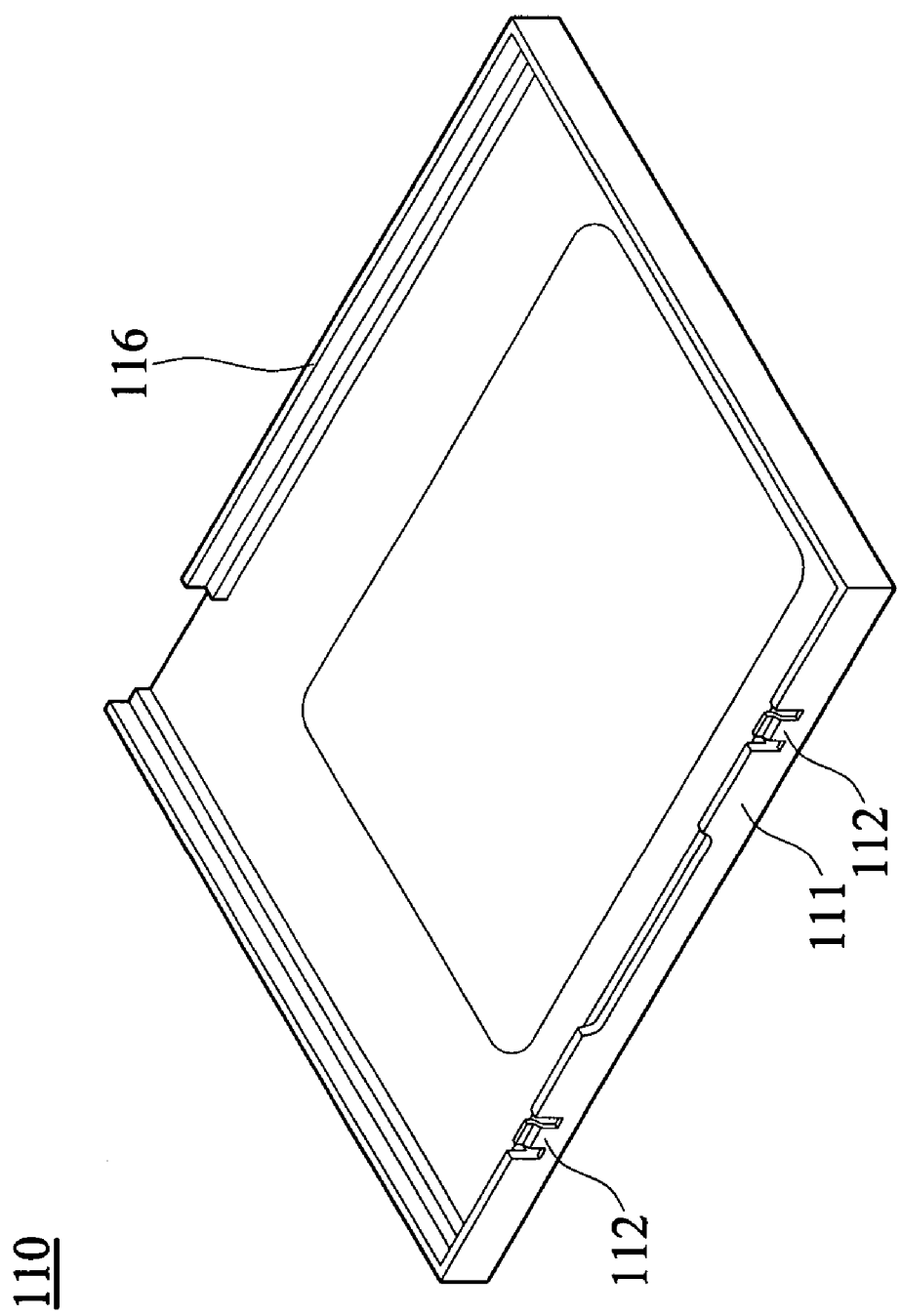
Figure 4C:
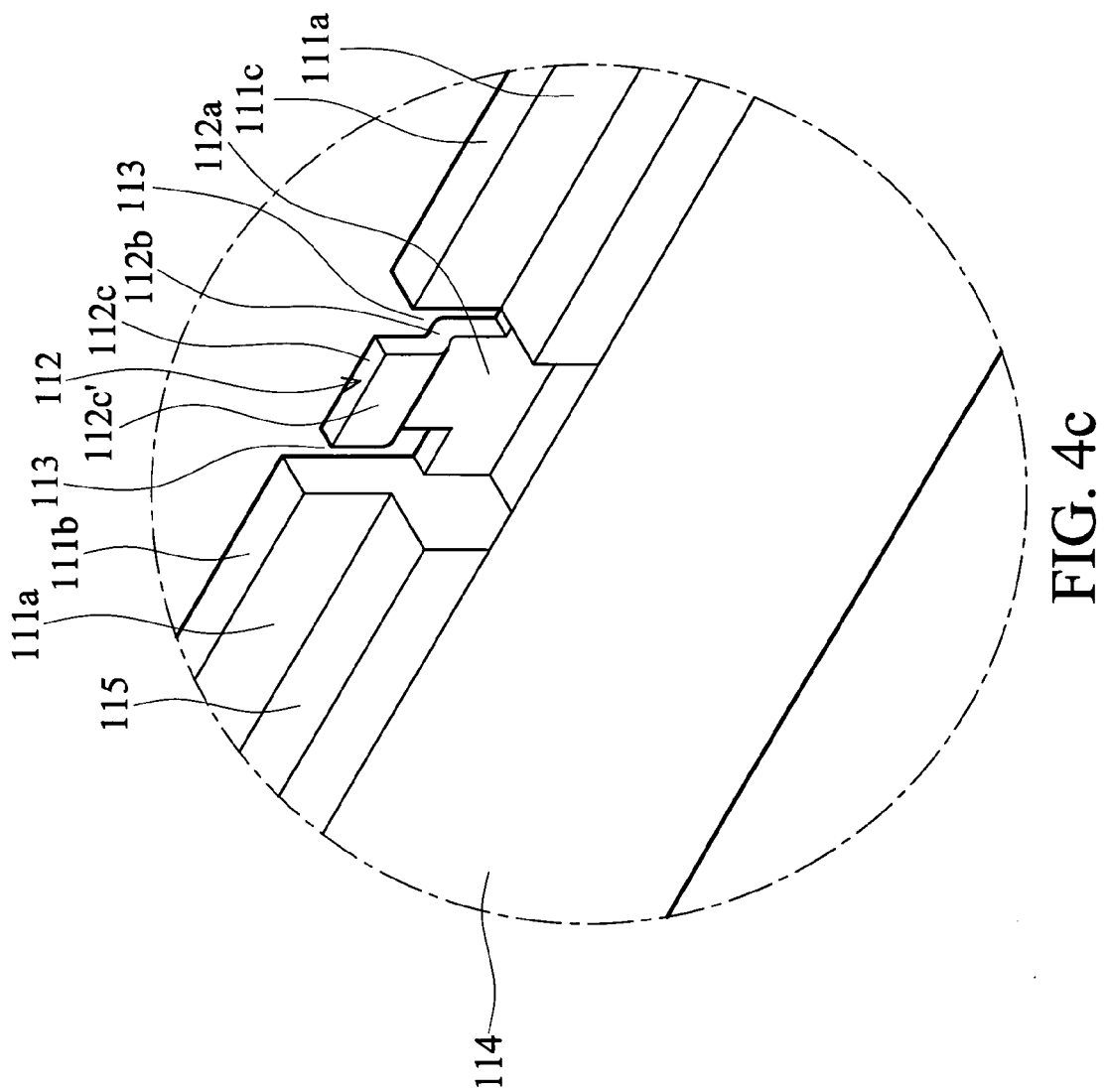

Referring to FIGS. 4a and 4b, the frame 110 is made of plastic, and comprises a first sidewall 111, two elastic arms 112, a bottom 114, a support 115, and a second sidewall 116. The first sidewall 111 comprises a first portion 111b and a second portion 111c. Both the first and second portions 111b and 111c have an inner surface 111a, as shown in FIG. 4c.

Figure 4D:
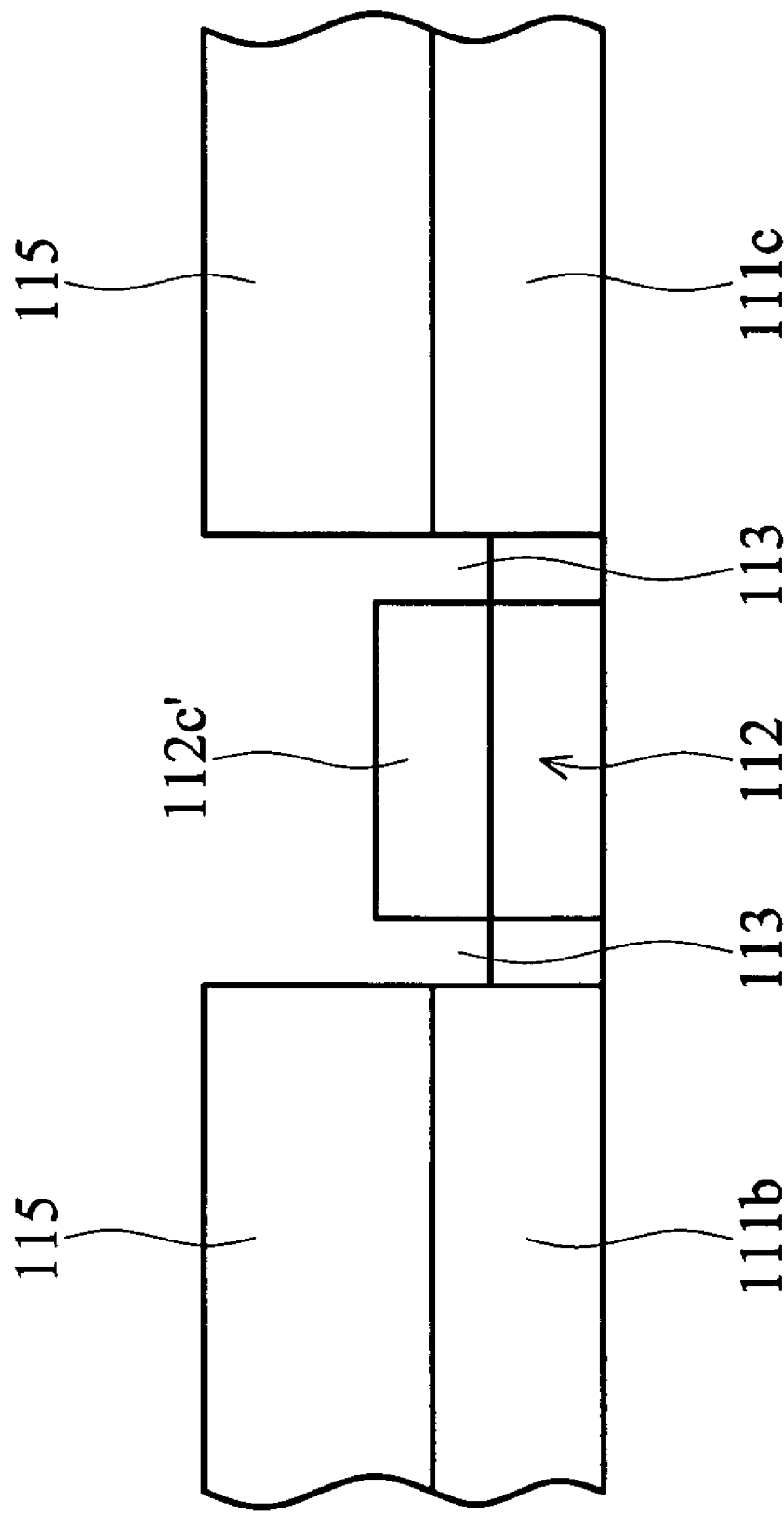

Each elastic arm 112 is formed on the frame 110 in a manner to be moveable with respect to the first sidewall 111. Each elastic arm 112 is located between the first portion 111b and the second portion 111c, and is substantially inverted T-shape. As shown in FIG. 4c, each elastic arm 112 comprises a base portion 112a, a connecting portion 112b, and an abutment portion 112c. The base portion 112a connects the first portion 111b and the second portion 111c. The connecting portion 112b connects the base portion 112a and the abutment portion 112c, and a cross section of the connecting portion 112b is substantially S-shape. Thus, an abutment surface 112c' of the abutment portion 112c is located inside the inner surfaces 111a of the first and second portions 111b and 111c, as shown in FIG. 4d. That is, the abutment surface 112c' protrudes from the inner surfaces 111a of the first and second portions 111b and 111c. As a result, when the liquid crystal panel 120 is placed in the frame 110 to abut the elastic arm 112, it may be held in the frame 110 by the recovery force of the elastic arm 112.

Additionally, a notch 113 is formed between the abutment portion 112c and the first and second portions 111b and 111c respectively. Thus, the elastic arm 112 may move freely with respect to the first sidewall 111. Furthermore, the abutment portion 112c extends upward from the base portion 112a toward the inside of the frame 110.

Alternatively, the elastic arm 112 may be I-shape as long as the notch 113 is formed between the abutment portion 112c and the first and second portions 111b and 111c respectively. Furthermore, although a cross section of the elastic arm 112 is substantially S-shape in FIG. 4c, it is not limited to this, and may be N-shape or inverted L-shape.

Note that the thickness of the first sidewall 111 is greater than the thickness of the elastic arm 112. Additionally, the elastic arm 112 and the first sidewall 111 are integrally formed into a single piece.

Figure 5A:
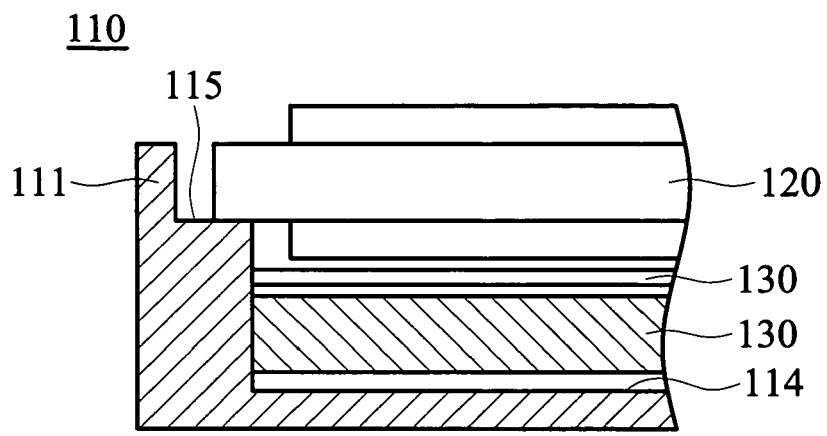

Referring to FIG. 5a, the bottom 114 supports a light guide plate and films, such as a reflector, a diffuser, and a prism, thereon. The support 115 supports the liquid crystal panel 120 thereon. The second sidewall 116 is opposite to the first sidewall 111. The support 115 is also formed adjacent to the second sidewall 116 to horizontally hold the liquid crystal panel 120 in the frame 110.

The liquid crystal panel 120 is disposed in the frame 110 in a manner such that the liquid crystal panel 120 abuts the abutment surface 112c' of the abutment portion 112c of the elastic arm 112, as shown in FIG. 3. During assembly, the liquid crystal panel 120 pushes the elastic arm 112 so that the abutment surface 112c' of the elastic arm 112 may be flush with the inner surface 111a.

Figure 5B:
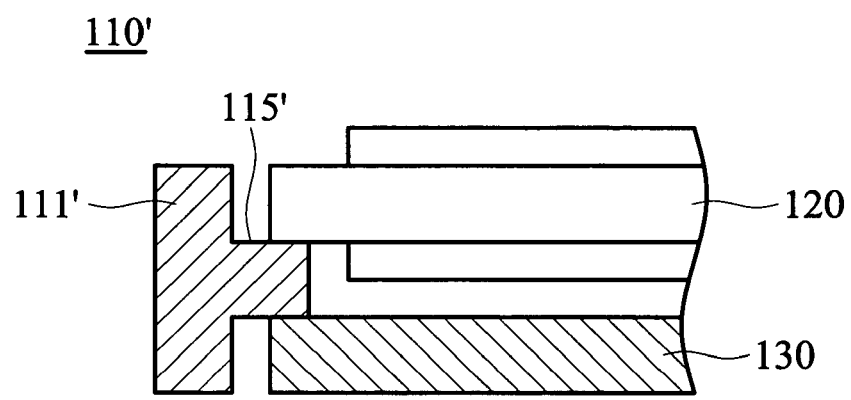
FIG. 5b is a schematic view of another embodiment of a frame.
Figure 5C:
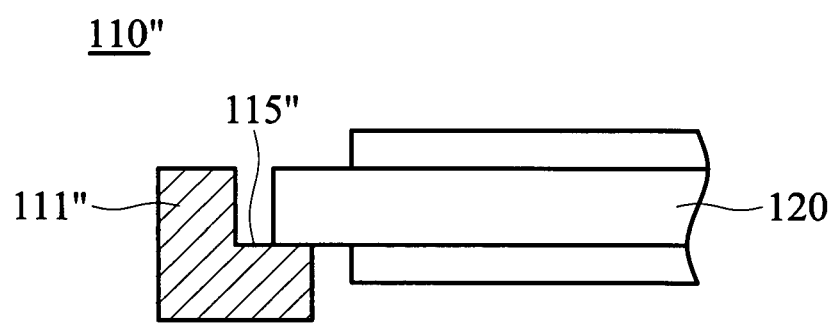
FIG. 5c is a schematic view of another embodiment of a frame.

Additionally, in this embodiment, while the frame 110 comprises the first sidewall 111, the bottom 114 and the support 115, to comprise a stepped structure as shown in FIG. 5a, it is not limited thereto. For example, another embodiment of a frame 110', shown in FIG. 5b, comprises a support 115' without the bottom. Thus, a cross section of the frame 110' is substantially T-shape. FIG. 5c depicts another embodiment of a frame 110", wherein a cross section of the frame 110" is substantially L-shape.

Figure 6:
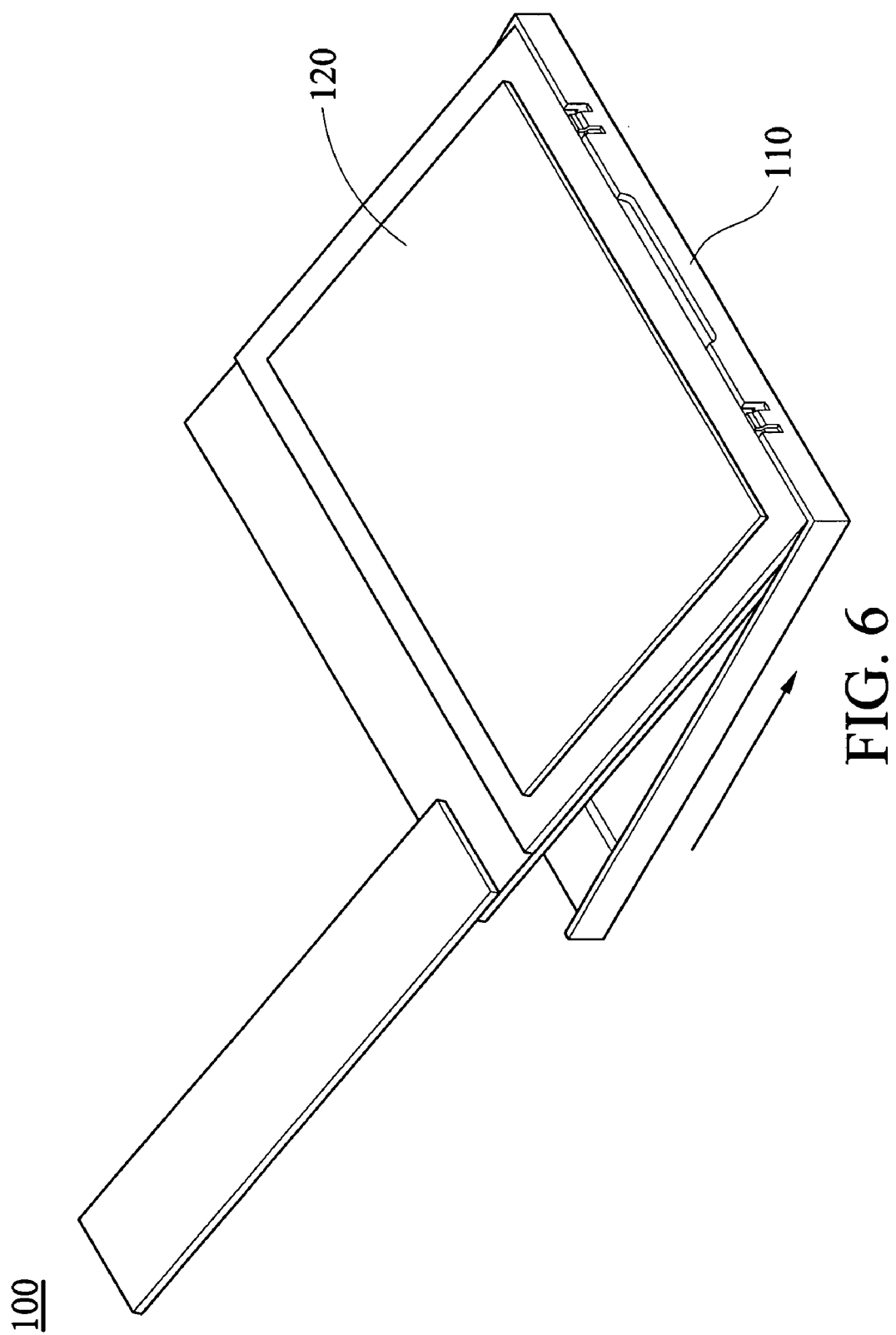
FIG. 6 is a schematic view of an embodiment of a liquid crystal display module during assembly.

To assemble the liquid crystal panel 120 into the frame 110, one side of the liquid crystal panel 120 first abuts the first sidewall 111 of the frame 110, as shown in FIG. 6. At this time, the liquid crystal panel 120 pushes the elastic arm 112 so that the abutment surface 112c' of the elastic arm 112 is flush with the inner surface 111a. Then, the liquid crystal panel 120 is pushed downward into the frame 110. By the recovery force of the elastic arm 112, the liquid crystal panel 120 is moved toward the second sidewall 116 to be held by the second sidewall 116.

As previously described, the liquid crystal panel of this embodiment may be restrained in the frame by the elastic arm. Additionally, the elastic arm of this embodiment is easily manufactured, thus simplifying the structure of a mold for manufacturing the frame. Specifically, when the frame is manufactured by injection molding, only dies are required without slides or pins, thus simplifying the manufacture process.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display module for holding a liquid crystal panel thereof, comprising:
   a frame, comprising:
      a sidewall comprising a first portion and a second portion, wherein both the first portion and the second portion have an inner surface; and
      an elastic arm, located between the first portion and the second portion, comprising a base portion and an abutment portion, wherein the base portion connects the first portion and the second portion, and a notch is formed between the abutment portion and the first and second portions respectively, and the abutment portion comprises an abutment surface and extends upward from the base portion toward the inside of the frame;
   a liquid crystal panel disposed in the frame in a manner such that the liquid crystal panel abuts the abutment surface of the abutment portion of the elastic arm and the abutment surface of the abutment portion of the elastic arm is flush with the inner surface, wherein the abutment surface remains flush with the inner surface after the liquid crystal panel is disposed in the frame.

2. The liquid crystal display module as claimed in claim 1, wherein the elastic arm is substantially an inverted T-shape.

3. The liquid crystal display module as claimed in claim 1, wherein the elastic arm is substantially an I-shape.

4. The liquid crystal display module as claimed in claim 1, wherein the frame further comprises a bottom and a support on which the liquid crystal panel is disposed.

5. The liquid crystal display module as claimed in claim 1, wherein the frame further comprises a support on which the liquid crystal panel is disposed, and a cross section of the sidewall and the support is substantially T-shape.

6. The liquid crystal display module as claimed in claim 1, wherein the frame further comprises a support on which the liquid crystal panel is disposed, and a cross section of the sidewall and the support is substantially L-shape.

7. The liquid crystal display module as claimed in claim 1, wherein the thickness of the sidewall is greater than the thickness of the abutment portion.

8. The liquid crystal display module as claimed in claim 1, wherein the thickness of the sidewall is greater than the thickness of the elastic arm.

9. The liquid crystal display module as claimed in claim 1, wherein the elastic arm and the sidewall are integrally formed into a single piece.

10. The liquid crystal display module as claimed in claim 1, wherein the frame comprises plastic.

* * * * *